United States Patent
Joe et al.

(10) Patent No.: US 8,834,711 B2
(45) Date of Patent: Sep. 16, 2014

(54) UPSTREAM OZONE CONTACT TANK FOR REMOVING RESIDUAL OZONE

(75) Inventors: Woo Hyeun Joe, Seoul (KR); Young Ae Baek, Seoul (KR); Gang-Seok Baek, Seongnam-si (KR); Byeong-Eui Hong, Seoul (KR); Byeong-Chul Jang, Seoul (KR); Mun-Ho Son, Gwangmyeong-si (KR); Young Jun Choi, Yongin-si (KR); Sang Tae Han, Seoul (KR)

(73) Assignee: Seoul Metropolitan Government, Seoul (KR)

( * ) Notice: Subject to any disclaimer, the term of this patent is extended or adjusted under 35 U.S.C. 154(b) by 471 days.

(21) Appl. No.: 12/999,307

(22) PCT Filed: May 28, 2009

(86) PCT No.: PCT/KR2009/002820
§ 371 (c)(1),
(2), (4) Date: Dec. 15, 2010

(87) PCT Pub. No.: WO2010/055982
PCT Pub. Date: May 20, 2010

(65) Prior Publication Data
US 2011/0220558 A1    Sep. 15, 2011

(30) Foreign Application Priority Data
Nov. 11, 2008    (KR) ......................... 10-2008-0111426

(51) Int. Cl.
*C02F 1/28*    (2006.01)
*C02F 1/78*    (2006.01)
*C02F 1/72*    (2006.01)

(52) U.S. Cl.
CPC . *C02F 1/78* (2013.01); *C02F 1/283* (2013.01); *C02F 1/725* (2013.01)

USPC ............ 210/86; 210/110; 210/151; 210/202; 210/275; 210/289; 210/502.1

(58) Field of Classification Search
None
See application file for complete search history.

(56) References Cited

U.S. PATENT DOCUMENTS 5,711,887 A  *  1/1998  Gastman et al. ........... 210/748.1

FOREIGN PATENT DOCUMENTS

| JP | 05-084500 |   | 4/1993 |
|----|-----------|---|--------|
| JP | 05084500 A | * | 4/1993 |
| JP | 07256247 A | * | 10/1995 |
| KR | 10-1997-0010680 |  | 3/1997 |
| KR | 10-2005-0034664 |  | 4/2005 |

OTHER PUBLICATIONS

Machine English translation of JP05084500; Apr. 1993.*

(Continued)

*Primary Examiner* — Terry Cecil
(74) *Attorney, Agent, or Firm* — Blakely Sokoloff Taylor & Zafman LLP

(57) ABSTRACT

The present invention relates to an upstream ozone contact tank for removing residual ozone. The upstream ozone contact tank includes an inlet through which purified raw water flows, at least one contact chamber, at least one reaction chamber, an upstream contact chamber, and an outlet that discharges ozone-treated raw water. Especially, the invention provides an upstream contact chamber between the reaction chamber and outlet, wherein the upstream contact chamber includes carbonaceous filter media mounted on a porous plate. An openable gate unit is installed at the lower part of a panel partitioning a final reaction chamber and the upstream contact chamber and controls flow rate. Additionally, the invention enables upstream flow of the raw water flowing into the upstream contact chamber from the final reaction chamber so that the raw water may pass through the carbonaceous filter media upwardly.

1 Claim, 5 Drawing Sheets

(56) References Cited

OTHER PUBLICATIONS

Machine English Translation of JP 07256247; Oct. 1995.*

PCT International Search Report for PCT Counterpart Application No. PCT/KR2009/002820 containing Communication relating to the Results of the Partial International Search Report, 4 pgs., (Jan. 11, 2010).

* cited by examiner

UPSTREAM OZONE CONTACT TANK FOR REMOVING RESIDUAL OZONE

CROSS-REFERENCE TO RELATED APPLICATIONS

This patent application is a U.S. National Phase application under 35 U.S.C. §371 of International Application No. PCT/KR2009/002820, filed on May 28, 2009, entitled UPSTREAM OZONE CONTACT TANK FOR REMOVING RESIDUAL OZONE, which claims priority to Korean Patent Application No. 10-2008-0111426, filed on Nov. 11, 2008.

FIELD OF TECHNOLOGY

The present invention relates to an upstream ozone contact tank for removing residual ozone with carbonaceous filter media, especially anthracite. Especially the ozone contact tank removes residual ozone upwardly while inflow is passing through the carbonaceous filter media.

BACKGROUND OF TECHNOLOGY

Generally, a progress of ozonation is one of the highest process levels in the field of purifying water. In the process of purifying water, ozone ($O_3$) can dismantle and remove taste and odor materials and THM (trihalomathane) precursor, can erase color, insolubilize iron and manganese, and can get rid of a very small amount of various harmful materials with a strong oxidation power so that it has a broad range of use in the field of purifying water. Thanks to those effects, a large number of filtration plants in the world introduce and operate the progress of ozonation.

According to the injecting point, ozone is classified as three steps: pre-ozonation, intermediate-ozonation, post-ozonation. Pre-ozonation is processed on the stage of water-intake and intermediate-ozonation is processed after the depositing reservoir specifically injecting ozone on the front side of sand filter paper. Post-ozonation is to inject ozone on the latter part of sand filter paper. Generally, a granule activated carbon process follows after post-ozonation so that the country operates it as a biological activated carbon process.

In the process of filtration system, ozone is produced with the materials such as air or oxygen through the ozonizer and is used after liquefying gaseous ozone through the diffuser (or ejector). However, ozone is not 100% completely dissolved in water so the residual ozone is processed to be conveyed from the top of the sealed ozone contractor to residual ozone destroyer after contact with water.

As stated above, it is widely used in the process of purifying water because of the effect of improving water quality. However, if you inhale gaseous ozone for a long time, it reaches to the fine organs and alveolus and causes pulmonary emphysema, and it may cause abnormal chromosome or alter red blood cells by producing peroxides with reaction on body material. Therefore, workers in the filtration plant should be aware of not being exposed to the gaseous ozone.

Ozone contractor currently being operated, is able to process residual ozone inside the contractor because of its sealed shape, but it creates a lot of problems while proceeding to the next step of ozone contact tank. Ozone is volatile when water with residual ozone is exposed to the atmosphere. In addition, in the post-ozonation, ozone is injected to maintain concentration of the residual ozone in the outflow at 0.03~0.4 mg/L, and granule activated carbon which will be applied to the next progress of ozone contact tank is downstream (move from up to down). Therefore, the upper part of granule activated carbon is open so that it is inevitable to smell ozone.

Because ozone is heavier than air, ozone odor is not discharged to the outside but stays in the building. For that reason, the health of managers working in the granule activated carbon building is threatened, and high-priced corrosion resistant materials should be used to resist against strong corrosiveness of ozone for the metal construction subsidiary materials within granule activated carbon.

Although there is a case to cover the upper side of granule activated carbon in order not to be exposed to the ozone gas, it has some difficulties to confirm directly the state of operation and the management. Also it makes workers and visitors of the filtration plant recognize that the filtration process is a dangerous facility. The residual ozone can be eliminated by injecting chemicals such as calcium thiosulfate, sodium sulfite, and hydrogen peroxide, however, which needs to raise operating expenses and can not be a green environmental device by using chemicals.

SUMMARY OF THE INVENTION

Technical Challenges

The present invention intends to solve the above problems hitherto involved. An object thereof is to install upstream ozone contact tank unlike to the existing downstream granule activated carbon contact tank.

The present invention equips the upstream ozone contact tank between existing ozone contact tank and granule activated carbon. Especially, it actively eliminates residual ozone by using various carbonaceous filter media and controlling speed of raw water that will flow into the upstream ozone contact tank.

The present invention desirably uses anthracite as carbonaceous filter media instead of granule activated carbon and eliminates the residual ozone by causing oxidation with carbon. Especially, anthracite has an advantage that it is cheap and has small rate of expansion because of its bigger weight than granule activated carbon.

Profitable Effect

According to the explanation about the present invention, the present invention provides to eliminate the residual ozone by making water including residual ozone pass through carbonaceous filter media.

Especially, the present invention removes the residual ozone by providing water including residual ozone upwardly, in other words with the upstream method, in order to pass through carbonaceous filter media.

The present invention is also designed to provide raw water flowing upward and is operated under a little bit expanded state of carbonaceous filter media so that it has an advantage that there is rare loss of head by the suspended solids within media.

The present invention provides green environmental technology which does not use exterior power and chemicals, and solves problems of corrosion at the stage of latter progress and ozone smell by completely eliminating the residual ozone.

EXPLANATION ABOUT SIGNS FOR IMPORTANT PARTS OF DRAWINGS

1—upstream ozone contact tank, 10—gate unit,
11—porous plate, 12—carbonaceous filter media,
14—backwashing discharge gate unit, 20—water gauge,
100—inlet, 101—diffuser,
102—contact chamber, 103—reaction chamber,
104—upstream contact chamber, 110—outlet

DESCRIPTION OF SPECIFIC EMBODIMENT

Hereinafter, preferred embodiments of the present invention will be set forth in detail with reference to the accompanying drawings.

Figure 1:
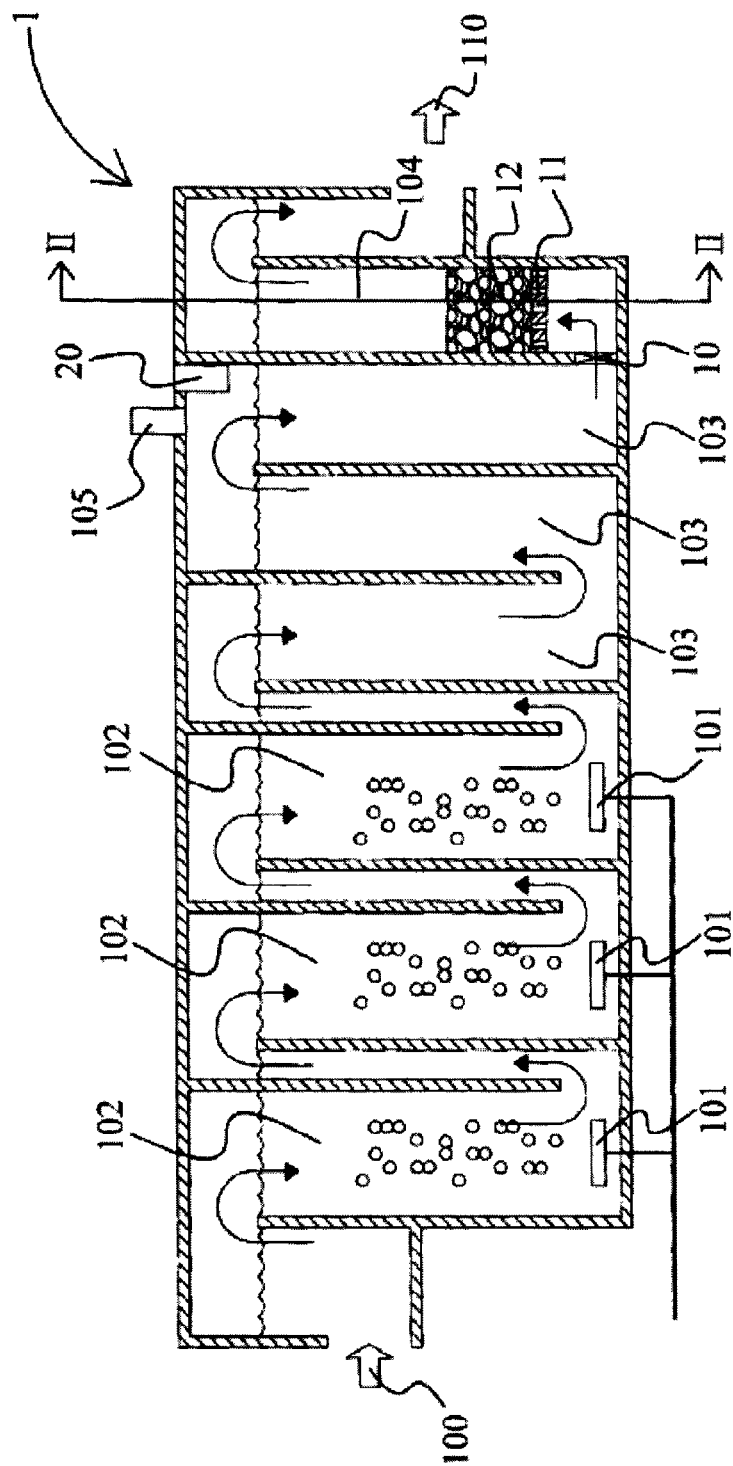
FIG. 1 is a rough side view of upstream ozone contact tank according to the present invention.

FIG. 1 is a rough side view of upstream ozone contact tank according to the present invention wherein illustrated arrows indicate the direction of water flow.

As it is generally known to the experts concerned, the upstream ozone contact tank (1) according to the present invention comprises an inlet (100) in which similarly filtrated raw water as the ozone contact tank (not illustrated) using existing technology flows, a diffuser (101), at least one contact chamber (102), at least one reaction chamber (103), and an outlet (110) to discharge ozone-treated raw water. As examined above, the present invention is similar to the existing technology so that it is easy to change the reaction chamber of the latter of ozone contact tank according to the existing technology to the upstream contact chamber according to the present invention, which is the distinctive feature of the present invention.

Although it is not illustrated, recently, there is a method to inject ozone using ejector and nozzle on a duct line before flowing into ozone contact tank instead of the diffuser (101). In that case, the present invention can be applied because its system is to change only on the latter part of ozone contact tank.

The present invention is a facility for ozonation in the filtration process. Here, it is explained mainly based on the post-ozonation which is widely used in the country, but it can be also applied to the pre-ozonation and intermediate ozonation according to circumstances.

The present invention comprises an inlet (100) in which raw water excluding suspended solids through filtering and sticking to media after passing through the sand filter paper flows into, at least one contact chamber (102), at least one reaction chamber (103), upstream contact chamber (104), and outlets (110) which discharge water passing through upstream contact chamber (104).

Upstream ozone contact tank (1) of the present invention comprises several chambers as mentioned above, three contact chambers (102) and three reaction chambers (103) on the front part which is near the inlet (100), and at least one upstream contact chamber (104) on the latter part which is near the outlet (110). FIG. 1 illustrates three contact chambers (102), three reaction chambers (103) and one upstream contact chamber (104), however, the number is flexible according to circumstances and the design.

Contact chamber (102) provides time and space enough to make injected gaseous ozone contact with raw water using a diffuser (101) installed on its floor. Reaction chamber (103) offers space for residual ozone to react on raw water. Especially, upstream contact chamber (104) according to the upstream ozone contact tank (1) of the present invention is designed on the latter part of upstream ozone contact tank (1), and arranges carbonaceous filter media (12) inside of it and removes residual ozone from raw water including residual ozone through contacting with carbonaceous filter media (12). The residual ozone is removed not by adsorption reaction with carbonaceous filter media but by contact reaction as below chemical equation.

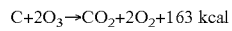

$$C + 2O_3 \rightarrow CO_2 + 2O_2 + 163 \text{ kcal} \qquad \text{Chemical equation 1}$$

Selectively, the contact chamber (102) and the reaction chamber (103) lead the raw water to flow downward from the upper side of chamber to the lower side of it in order to secure the contact time and reaction time like the arrow, on the other hand, upstream contact chamber (104) leads to flow from the lower part of chamber upwardly.

Reaction Chamber has a residual ozone outlet (105) to release remained ozone (residual ozone) out of upstream ozone contact tank of the present invention after dissolving ozone discharged from the diffusers (101) in raw water. Although it is not illustrated, residual ozone transferred along the residual ozone outlet (105) is eliminated not to leak outside from residual ozone destroyer (not illustrated).

In addition, the reaction chamber (103) further adheres water gauge (20) on the upper part of it so that it can detect water which goes over the set water level of upstream ozone contact tank (1) according to the present invention.

There is a gate unit (10) on the lower part of the panel partitioning between the last reaction chamber (103) and upstream contact chamber (104), and the openable gate unit (10).

The raw water going through the openable gate unit (10) and flowing into the upstream contact chamber (104) from the reaction chamber (103) is able to eliminate the residual ozone by passing through carbonaceous filter media (12). The carbonaceous filter media (12) can be supported by arriving safely at the porous plate (11). It is desirable to be made of ozone resistant materials and to let raw water flowing into through the porous plate (11) be distributted evenly and pass by carbonaceous filter media (12). Selectively, IMS (integral media support) can be applied to the porous plate (11).

A baffle for absorbing shock may be mounted before reaching the porous plate (11) to control flow rate of the raw water.

The raw water passing through carbonaceous filter media (12) flows into the filtration plant along the outlet (110) or removes the last residual ozone by sending out to granule activated carbon which is equipped before a final outlet. In addition, ozone-treated water which will be discharged to the outlet (110) is charged by anthracite or granule activated carbon (12), a carbonaceous filter media, inside the water pipe which passes through between the outlet (110) and succeeding process so that it can additionally eliminate ozone.

The carbonaceous filter media (12) desirably uses granule activated carbon or anthracite, but it is more desirable to use anthracite. Because the density of anthracite is smaller than granule activated carbon, it preeminently removes the residual ozone than granule activated carbon at the concentration of remaining ozone as illustrated on FIG. 3 and FIG. 5 if anthracite makes the contact space with raw water wider. The explanation thereof is described later.

As working time goes by, the loss of head increases if suspended solids moving along raw water accumulate on the carbonaceous filter media (12) by filtering or adhering to the surface of carbonaceous filter media (12), and the level of water inside the ozone contact tank (1) of the present invention rises if the gap between carbonaceous filter media (12) is getting smaller and raw water can not flow upward smoothly.

Figure 2:
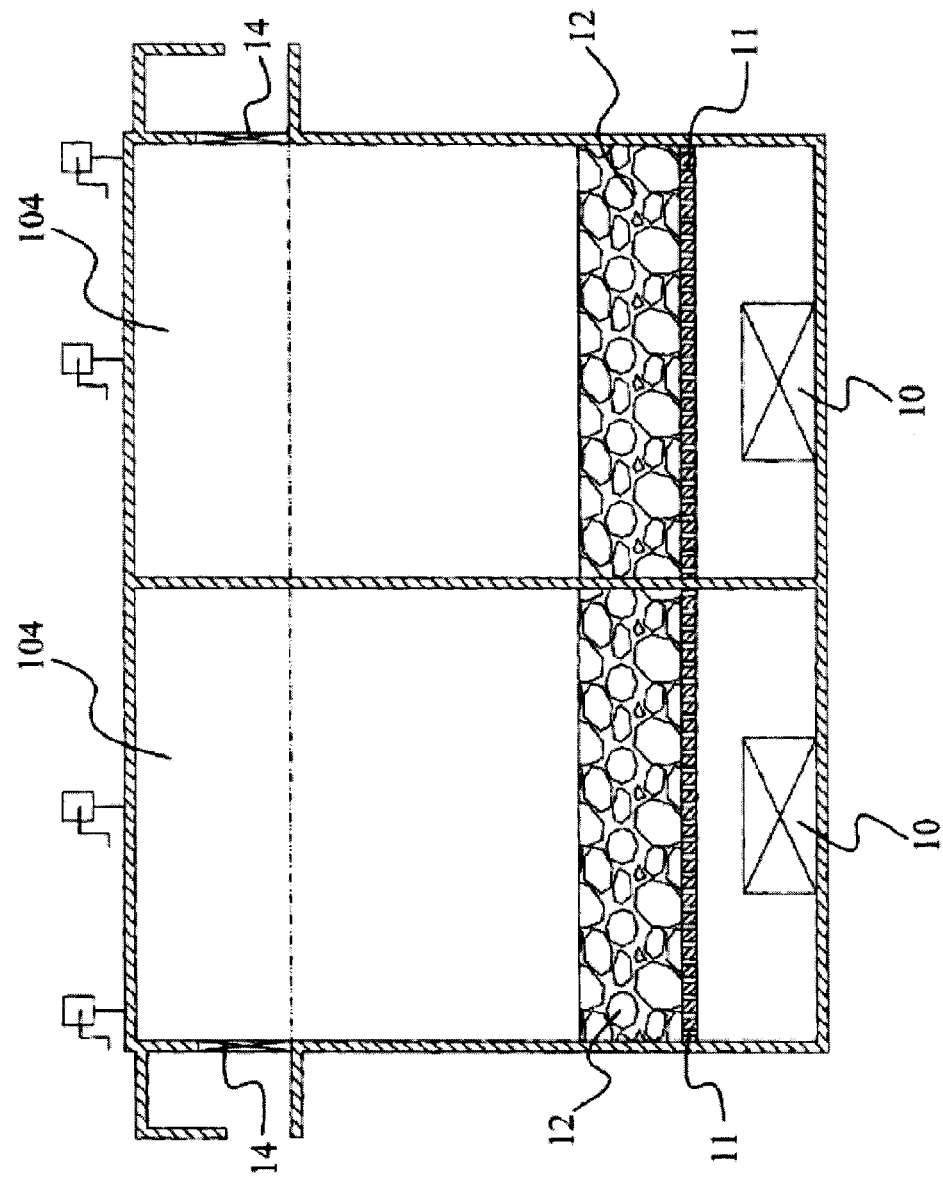
FIG. 2 is a cross sectioned view according to II-II of FIG. 1.

FIG. 2 is a cross sectioned view according to II-II of FIG. 1.

As illustrated, the upstream contact chamber (104) of the present invention has gate unit (10) which control the amount of raw water, porous plate (11) and carbonaceous filter media (12).

As described, a baffle can be installed under the porous plate (11).

Upstream contact chamber (104) is separated to arrange at least one section, desirably 2 sections, in parallel (at a right angle to the length direction of ozone contact tank). Specifically, one of the two gate units (10) of contact chamber (104) is to be closed if the water level of ozone contact tank (1; refer to FIG. 1) rises due to the plenty of accumulation of suspended solids at the carbonaceous filter media (12) equipped to upstream contact chamber (104). The rest of gate unites (10) keep open but one gate unit (10) is closed. Therefore, the speed of raw water flowing into upstream contact chamber (104) through open gate unit (10) increases. That speed makes carbonaceous filter media (12) expand so that back washing progress to separate suspended solids from carbonaceous filter media can be carried out. Backwashing draining is carried out by adding backwashing discharge gate unit (14) separately on the upper part of upstream contact chamber (104).

For that purpose, it is desirable to have two separated upstream contact chambers (104), and it is designed to shift carbonaceous filter media easily by closing gate unit (10) alternately not stopping the operation of ozone contact tank of the present invention when carbonaceous filter media (12) used for a long time needs to be changed.

When more than two upstream ozone contact tanks are formed in order to apply to a large-scale facility, backwashing process can be carried out by controlling gate unit of inlet (100) maintaining the gate unit (10) open.

Figure 3:
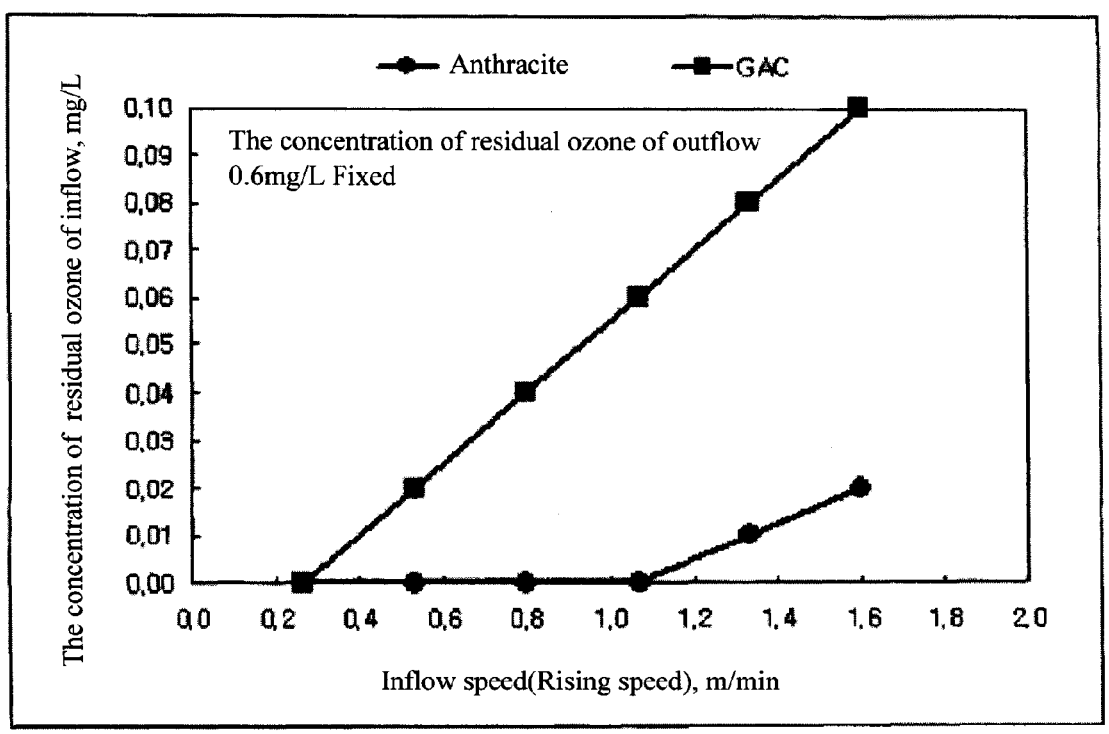
FIG. 3 is a graph of speed of inflow to carbonaceous granule filter media from upstream ozone contact tank and of concentration of residual ozone of outflow passing through it.

FIG. 3 is a graph of speed of inflow to carbonaceous filter media from upstream ozone contact tank and of concentration of residual ozone of outflow passing through it.

It analyzes the elimination effect of removing residual ozone concentration of granule activated carbon (GAC) and anthracite according to the flow rate passing through gate unit (10) and flowing into porous plate (11) after fixing the residual ozone concentration of inflow water of upstream ozone contact tank according to the present invention at 0.6 mg/L, the highest level (Generally, average residual ozone concentration of the latter part of ozone contact tank in the country is 0.05~0.4 mg/L). Residual ozone is detected at over 0.2 m/min of inflow speed, as illustrated in the graph for granule activated carbon, and at over 1.0 m/min of inflow speed for anthracite.

Figure 4:
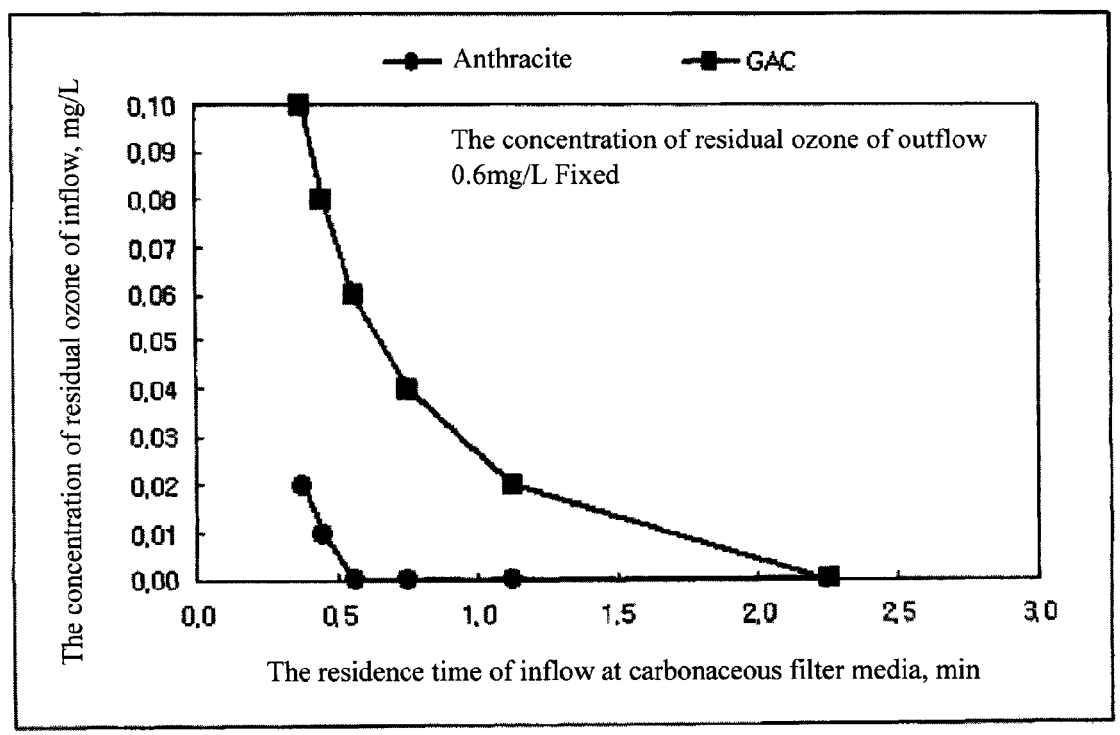
FIG. 4 is a graph of residual ozone concentration of outflow and residence time of inflow at carbonaceous granule filter media in upstream ozone contact tank according to the present invention.

FIG. 4 is a graph of residual ozone concentration of outflow and residence time of inflow at carbon granule media in upstream ozone contact tank according to the present invention.

It shows residence time necessary for anthracite and granule activated carbon (GAC) which is the carbonaceous filter media used for upstream ozone contact tank according to the present invention. Residual ozone does not appear after 0.5~1 min for anthracite and 2~2.5 min for granule activated carbon. Hereby, it shows that anthracite removes effectively residual ozone under the circumstance of short time of contact and fast flow rate.

Figure 5:
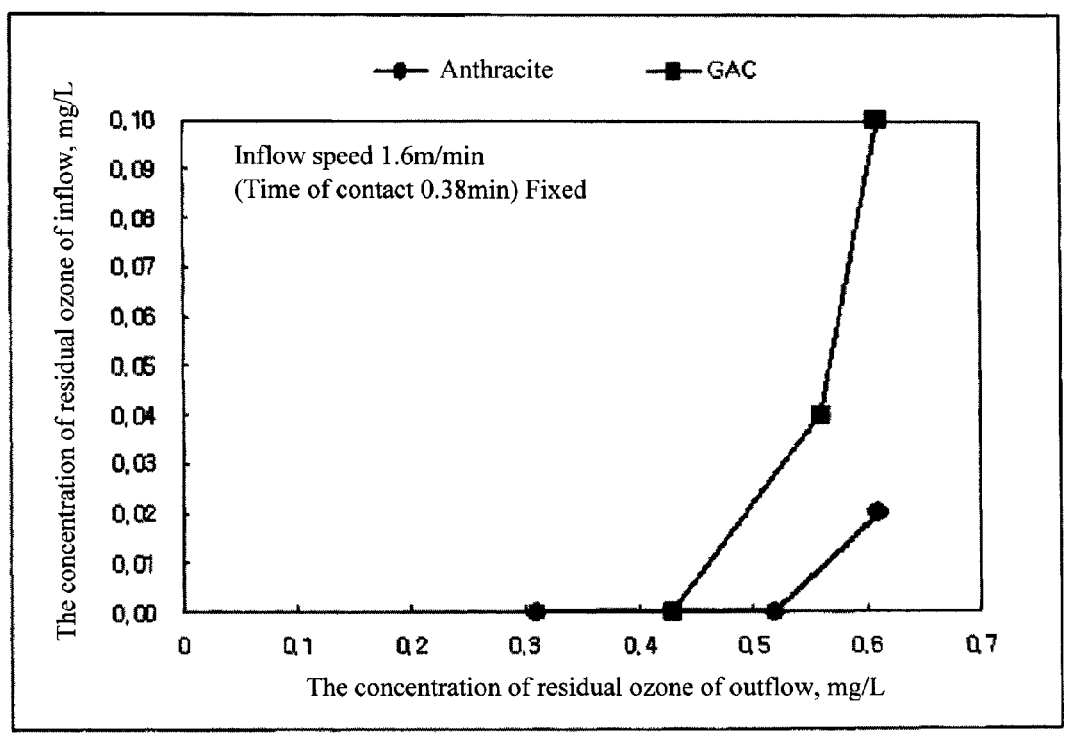
FIG. 5 is a graph of residual ozone concentration of inflow into carbonaceous granule filter media from upstream ozone contact tank according to the present invention and of the residual ozone concentration of outflow.

FIG. 5 is a graph of residual ozone concentration of inflow into carbon granule media from upstream ozone contact tank according to the present invention and of the residual ozone concentration of outflow.

It observes residual ozone concentration of raw water passing through media (anthracite and granule activated carbon) by varying the residual ozone concentration of raw water and fixing the speed of inflow water passing through gate unit (10) at 1.6 m/min. As illustrated, the residual ozone of outflow is detected at over 0.4 mg/L of residual ozone concentration of inflow for granule activated carbon and over 0.5 mg/L of that for anthracite.

The present invention is not defined to the summary of the invention. It can be modified and changed within the below claims.

What is claimed is:

1. An ozone contact tank for removing residual ozone comprising an inlet where purified raw water flows into, at least one contact chamber and at least one outlet where ozone-treated raw water flows out, wherein the ozone contact tank comprises:

an upstream contact chamber placed between the at least one contact chamber and the at least one outlet;

a porous plate forming numerous holes and arranged across the upstream contact chamber;

ozone removing filter media which settles safely on the porous plate and removes residual ozone;

at least one gate unit equipped on a lower part of a panel partitioning the upstream contact chamber from the contact chamber;

wherein the gate unit is openable and controls speed of inflow of the ozone-treated raw water which will flow into the upstream contact chamber, and the raw water flowing into the upstream contact chamber from the contact chamber flows upward from the lower part of the filter media so that the ozone removing filter media is changable after closing the gate unit alternately for each upstream contact chamber without stopping operation of the ozone contact tank when the ozone removing filter media needs to be changed after use, wherein a backwashing process can be carried out alternately for each upstream contact chamber by controlling the inlet and the gate unit of each upstream contact chamber;

wherein the filter media includes anthracite, and the upstream contact chamber includes at least two upstream contact chambers arranged in parallel, at a right angle to the longitudinal direction of the ozone contact tank for removing residual ozone, wherein each upstream contact chamber comprises a separate backwashing discharge gate on an upper part of the upstream contact chamber for backwashing draining, and wherein the upstream contact tank further includes a water gauge to detect water level which goes over a set water level of the ozone contact tank, wherein the gate unit controls the speed of inflow of the ozone-treated raw water which will flow into the upstream contact chamber.

* * * * *